(12) United States Patent
Tsai

(10) Patent No.: US 6,457,922 B1
(45) Date of Patent: Oct. 1, 2002

(54) EXPANSION BOLT ASSEMBLY

(76) Inventor: Chao-Yang Tsai, No. 19-1, Lane 31, Jui-Haing St., Chien-Chen Dist., Kaohsiung City (TW)

( * ) Notice: Subject to any disclaimer, the term of this patent is extended or adjusted under 35 U.S.C. 154(b) by 75 days.

(21) Appl. No.: 09/704,969

(22) Filed: Nov. 2, 2000

(51) Int. Cl.$^7$ .......................... F16B 13/04; F16B 13/06
(52) U.S. Cl. .......................... 411/55; 411/61; 411/60.2
(58) Field of Search ................ 411/60.1, 60.2, 411/55, 61, 62

(56) References Cited

U.S. PATENT DOCUMENTS

| | | | | |
|---|---|---|---|---|
| 4,011,786 A | * | 3/1977 | Liebig | 411/60.2 |
| 4,339,217 A | * | 7/1982 | Lacey | 411/60.2 |
| 4,570,891 A | * | 2/1986 | Kaplan | 411/389 X |
| 5,685,678 A | * | 11/1997 | Giannuzzi et al. | 411/60.2 |

FOREIGN PATENT DOCUMENTS

| DE | 3022011 | * | 12/1981 | 411/60.2 |
|---|---|---|---|---|
| GB | 2094919 | * | 9/1982 | 411/60.2 |

* cited by examiner

Primary Examiner—Neill Wilson
(74) Attorney, Agent, or Firm—Trop, Pruner & Hu, P.C.

(57) ABSTRACT

An expansion bolt assembly includes an elongated bolt body. The bolt body is formed with an externally threaded insert portion that is adapted to be inserted into a bore formed in a wall, and an anchoring portion that extends from the insert portion and that is adapted to extend out of the bore and to project from the wall. The anchoring portion includes an externally threaded shank and a turning unit. The turning unit is disposed on one end of the shank and is adapted to engage a tool for driving axial rotation of the bolt body. A washer is sleeved on the bolt body between the insert and anchoring portions, and is adapted to lie against the wall. A sleeve is sleeved on the insert portion and has a proximate section abutting against the washer, and a distal section opposite to the proximate section and formed with a plurality of axially extending slits. The sleeve cooperates with the insert portion to confine an annular expansion chamber therebetween. A nut engages threadedly the insert portion adjacent to the distal section of the sleeve. The nut is formed with a taper section that extends into the expansion chamber when the bolt body is driven to rotate relative to the nut.

2 Claims, 6 Drawing Sheets

EXPANSION BOLT ASSEMBLY

BACKGROUND OF THE INVENTION

1. Field of the Invention

The invention relates to an expansion bolt assembly, more particularly to an expansion bolt assembly with multiple functions.

2. Description of the Related Art

Referring to FIG. 1, a conventional expansion bolt assembly 1 includes a bolt body 11, an expansion sleeve 12 sleeved on the bolt body 11, and a nut 13 engaging threadedly the bolt body 11. One end of the bolt body 11 is formed with a head portion 14 adapted to be driven by a screwdriver (not shown). The nut 13 engages the opposite end of the bolt body 11. The sleeve 12 is interposed between the head portion 14 and the nut 13, and has a rear portion formed with a plurality of axially extending slits 121. In addition, the nut 13 is formed with a taper section 131 that can, due to the arrangement of the slits 121, extend into the rear portion of the sleeve 12 to force the sleeve 12 to expand.

With reference to FIG. 2, during installation, the conventional expansion bolt assembly 1 is inserted into a bore 151 formed in a wall 15 and of a size corresponding to the diameter of the expansion bolt assembly 1. A tool (not shown) is used to rotate the head portion 14 and the bolt body 11. At this time, friction acting on the nut 13 will cause the latter to displace and extend into the rear portion of the sleeve 12 such that the taper section 131 thereof forces the rear portion of the sleeve 12 to expand. Hence, the rear portion of the sleeve 12 can frictionally engage the portion of the wall 15 confining the bore 151 to thereby position the expansion bolt assembly 1 firmly in the wall 15.

However, in use, the conventional expansion bolt assembly 1 can only be utilized to fix an object on a wall surface, and does not permit hanging of another object thereon or connection to another object.

SUMMARY OF THE INVENTION

Therefore, the main object of the present invention is to provide an expansion bolt assembly with multiple functions.

Accordingly, an expansion bolt assembly of the present invention is adapted to be installed on a wall that is formed with a bore. The expansion bolt assembly includes an elongated bolt body, a washer, a tubular expansion sleeve, and a nut. The bolt body is formed with an externally threaded insert portion that is adapted to be inserted into the bore, and an anchoring portion that extends from the insert portion and that is adapted to extend out of the bore and to project from the wall. The anchoring portion includes an externally threaded shank and a turning unit. The turning unit is disposed on one end of the shank and is adapted to engage a tool for driving axial rotation of the bolt body. The washer is sleeved on the bolt body between the insert and anchoring portions, and is adapted to lie against the wall. The sleeve is sleeved on the insert portion and has a proximate section abutting against the washer, and a distal section. The distal section is opposite to the proximate section and is formed with a plurality of axially extending slits. The sleeve cooperates with the insert portion to confine an annular expansion chamber therebetween. The nut engages threadedly the insert portion adjacent to the distal section of the sleeve. The nut is formed with a taper section that extends into the expansion chamber when the bolt body is driven to rotate relative to the nut, thereby forcing the distal section of the sleeve to expand so as to be adapted to frictionally engage a bore-defining surface of the wall.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
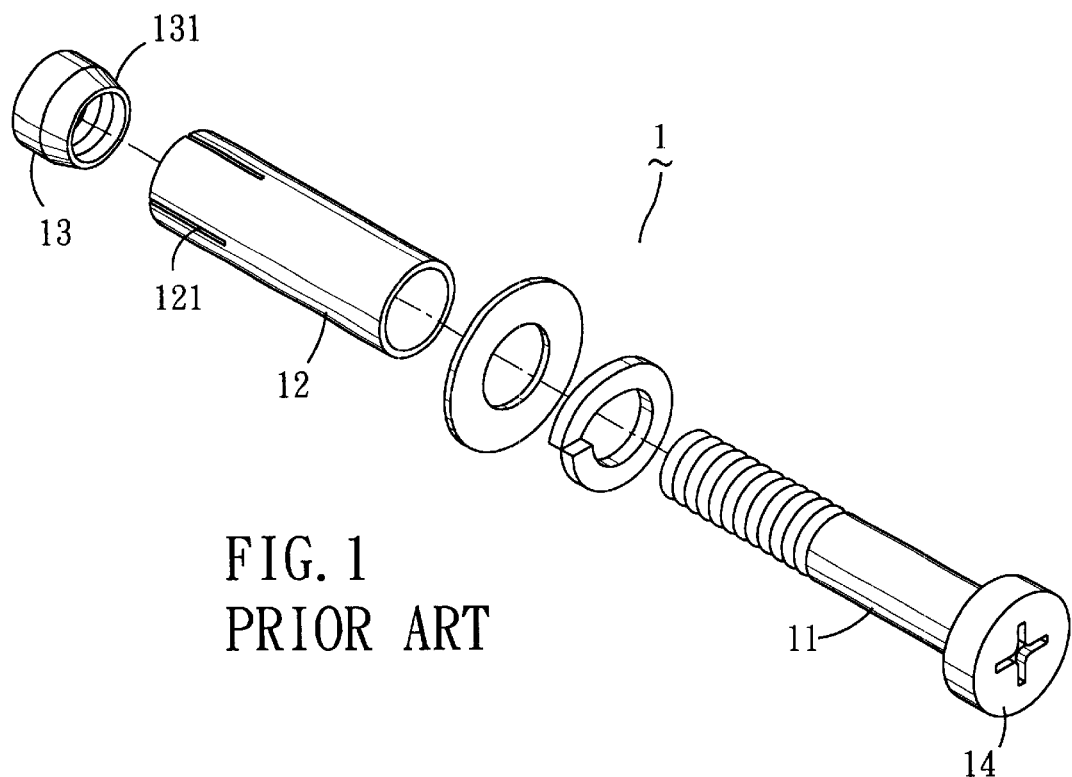
FIG. 1 is an exploded perspective view of a conventional expansion bolt assembly.
Figure 2:
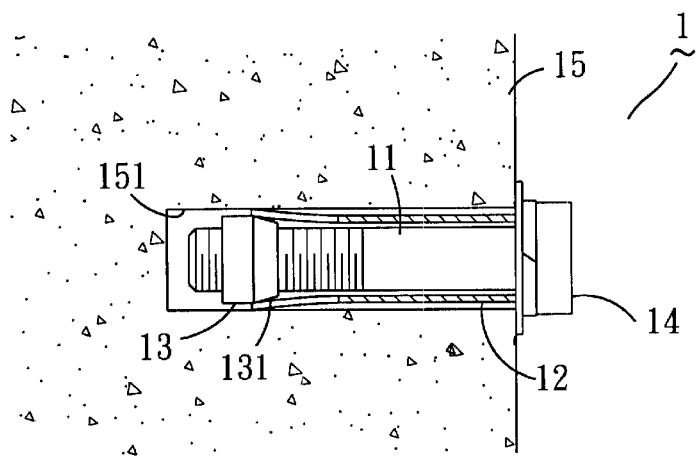
FIG. 2 is a partly sectional side view of the conventional bolt assembly when installed in a bore.
Figure 3:
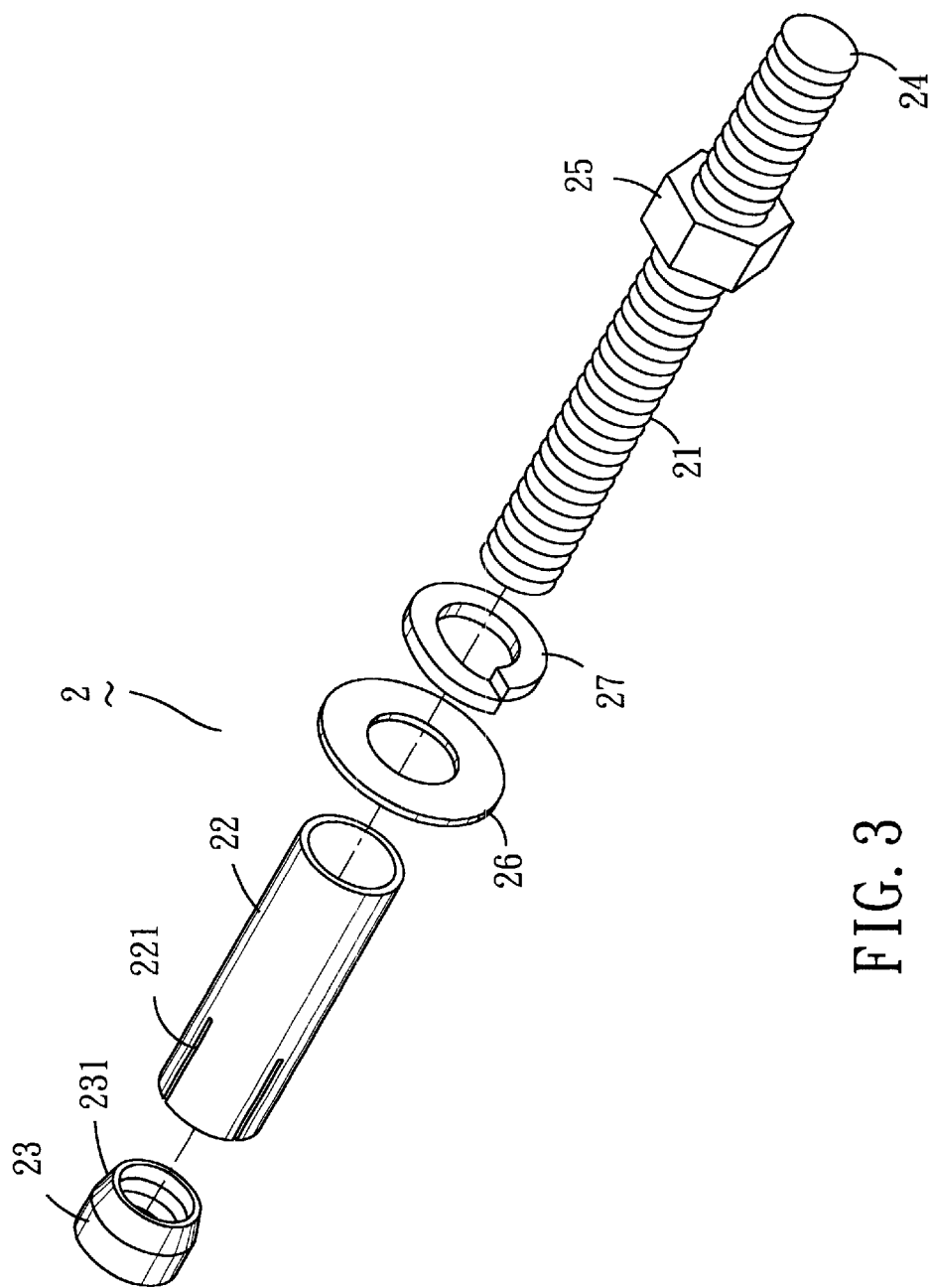
FIG. 3 is an exploded perspective view of the first preferred embodiment of an expansion bolt assembly according to the invention.
Figure 4:
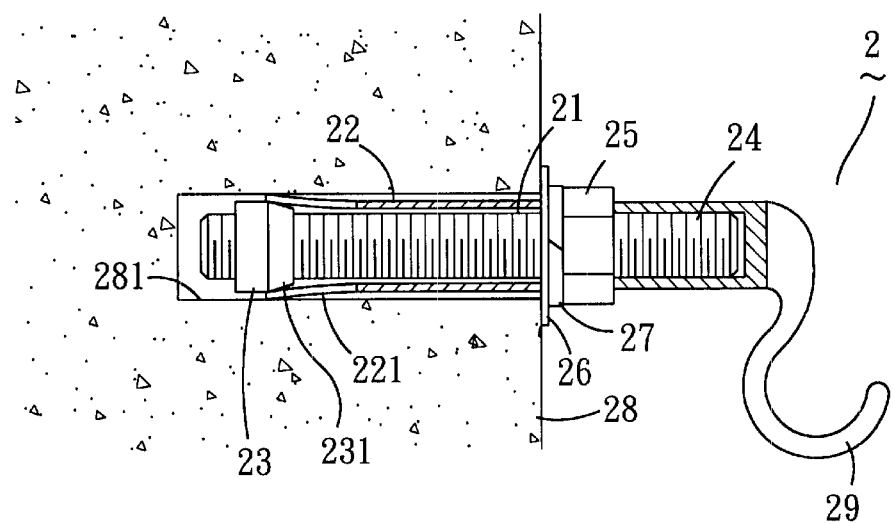
FIG. 4 is a partly sectional side view of the first preferred embodiment in a state of use.
Figure 5:
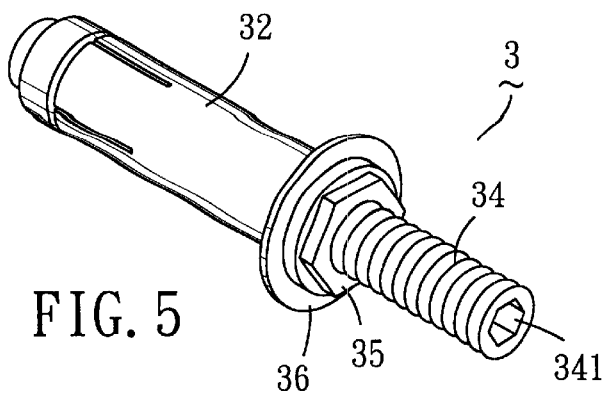
FIG. 5 is a perspective view of the second preferred embodiment of an expansion bolt assembly of the invention.

Referring to FIGS. 3 and 4, the first preferred embodiment of an expansion bolt assembly 2 according to the present invention is adapted to be installed on a wall 28 that is formed with a bore 281 of a diameter corresponding to that of the expansion bolt assembly 2. The expansion bolt assembly 2 is shown to include an elongated bolt body, a washer 26, a tubular expansion sleeve 22, and a nut 23. The bolt body is formed with an externally threaded insert portion 21 that is adapted to be inserted into the bore 281, and an anchoring portion that extends from the insert portion 21 and that is adapted to extend out of the bore 281 and to project from the wall 28. The anchoring portion includes an externally threaded shank 24 and a turning unit 25. One end of the shank 24 is disposed adjacent to the insert portion 21. The turning unit 25 is disposed on said one end of the shank 24 and is adapted to engage a tool (not shown) for driving axial rotation of the bolt body. In this embodiment, the turning unit 25 is formed as a radial outward polygonal projection that clamps the washer 26 against the wall 28.

The washer 26 is sleeved on the bolt body between the insert portion 21 and the anchoring portion, and is adapted to lie against the wall 28. A known resilient ring 27 may be disposed between the washer 26 and the insert portion 21 to provide an enhanced positioning effect.

The sleeve 22 is sleeved on the insert portion 21 and has a proximate section abutting against the washer 26, and a distal section opposite to the proximate section and formed with a plurality of axially extending slits 221. The sleeve 22 cooperates with the insert portion 21 to confine an annular expansion chamber therebetween.

The nut 23 engages threadedly the insert portion 21 adjacent to the distal section of the sleeve 22. The nut 23 is formed with a taper section 231 that extends into the expansion chamber when the bolt body is driven to rotate relative to the nut 23, thereby forcing the distal section of the sleeve 22 to expand so as to be adapted to frictionally engage a bore-defining surface of the wall 281.

During installation, the expansion bolt assembly 2 is inserted into the bore 281, and a tool, e.g., a spanner, is used to rotate the turning unit 25 so as to drive the bolt body into the bore 281, with the washer 26 clamped against the wall 28. At this time, as a result of friction acting on the nut 23, the nut 23 will gradually displace toward the distal section of the sleeve 22. Furthermore, due to the arrangement of the slits 221, the taper section 231 of the nut 23 can extend into the expansion chamber to force the distal section of the sleeve 22 to expand so as to frictionally engage the bore-defining surface of the wall 28, thereby completing installation of the expansion bolt assembly 2 on the wall 28.

The expansion bolt assembly 2 may further include an internally threaded hook member 29 to threadedly engage the shank 24 projecting from the wall 28 so as to permit the user to hang an article (not shown) on the hook member 29.

FIG. 3 shows the second preferred embodiment of an expansion bolt assembly 3 according to the present invention, which is basically similar to the first preferred embodiment in structure. As illustrated, the expansion bolt assembly 3 includes a bolt body with an externally threaded shank 34, a projection 35 on the shank 34, an expansion sleeve 32 sleeved on an insert portion (not visible) of the bolt body, and a washer 36 interposed between the projection 35 and the sleeve 32. In this embodiment, the end of the shank 34 that is remote from the projection 35 is formed with an axially extending recess 341 of a polygonal cross-section. During installation of the expansion bolt assembly 3, a tool (not shown) having a bit of a corresponding cross-section can be inserted into the recess 341 to rotate the bolt body so as to drive rotation of the bolt body. Then, an internally threaded hook or suspension member (not shown) can be disposed to threadedly engage the shank 34 for suspension of an article (not shown).

Figure 6:
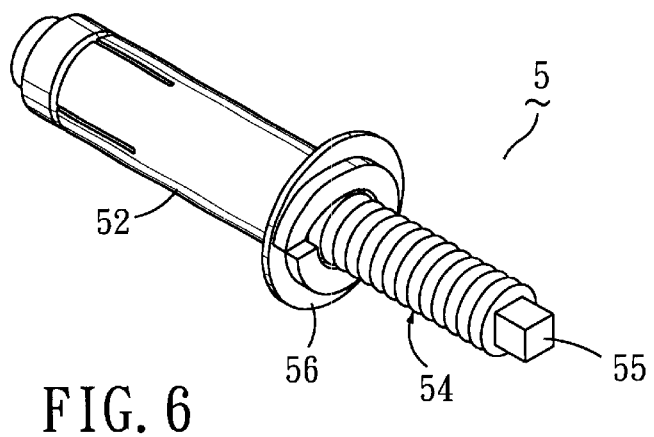
FIG. 6 is a perspective view of the third preferred embodiment of an expansion bolt assembly of the invention.

FIG. 6 shows the third preferred embodiment of an expansion bolt assembly 5 according to the present invention. This embodiment is substantially similar to the first preferred embodiment, the major difference residing in that an externally threaded shank 54 of the bolt body is disposed between a turning unit 55 and a washer 56 that is adjacent to an insert portion (not shown) of the bolt body which is concealed in an expansion sleeve 52. The turning unit 55 is formed as a tool-engaging projection that extends axially from one end of the shank 54 and that has a polygonal cross-section. Additionally, the turning unit 55 has a dimension smaller than the diameter of the shank 54. As such, during installation, the user can use an appropriate tool (not shown) to rotate the turning unit 55 so as to drive the expansion bolt assembly 5 into a wall (not shown). Likewise, an internally threaded hook or suspension member (not shown) can be disposed to threadedly engage the shank 54.

Figure 7:
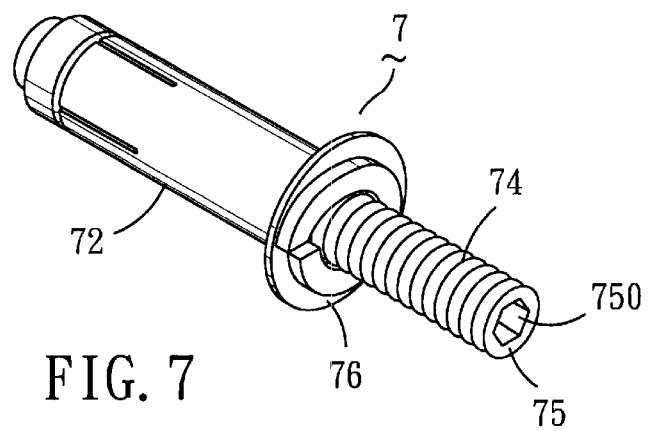
FIG. 7 is a perspective view of the fourth preferred embodiment of an expansion bolt assembly of the invention.

FIG. 7 shows the fourth preferred embodiment of an expansion bolt assembly 7 according to the present invention, which is substantially similar to the third preferred embodiment. The major difference resides in that a turning unit 75 is formed as a tool engaging recess 750 that extends axially and that has a polygonal cross-section, and is formed in one end of the externally threaded shank 74 that is remote from the washer 76 and the expansion sleeve 72.

In any of the previous embodiments, the shank can have a diameter different from that of the insert portion.

Figure 8:
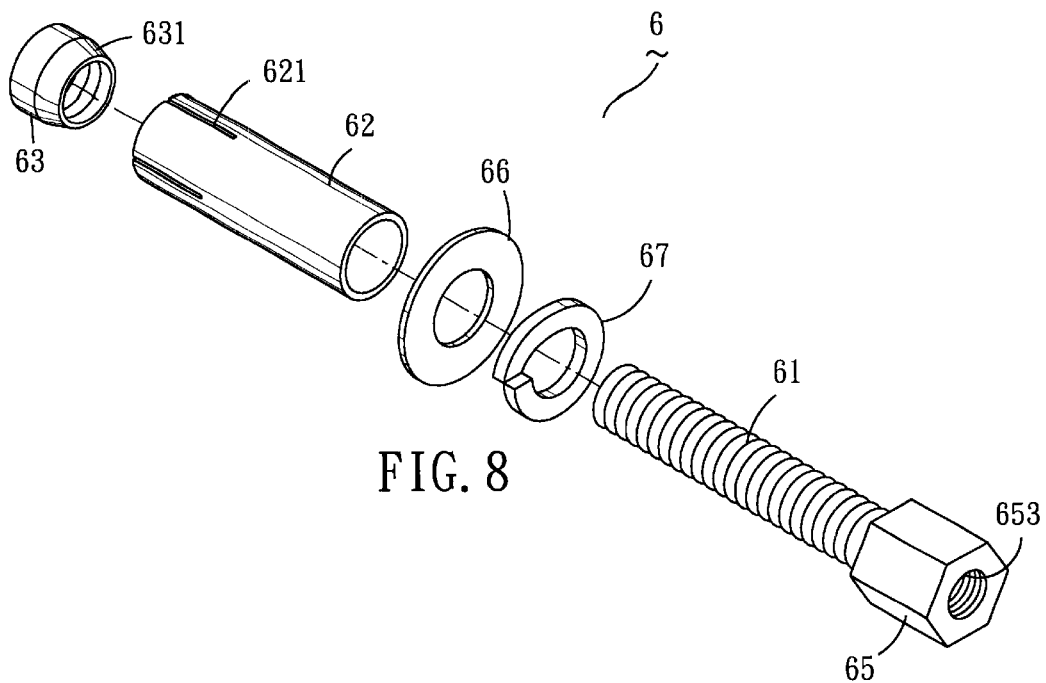
FIG. 8 is an exploded perspective view of the fifth preferred embodiment of an expansion bolt assembly of the invention.
Figure 9:
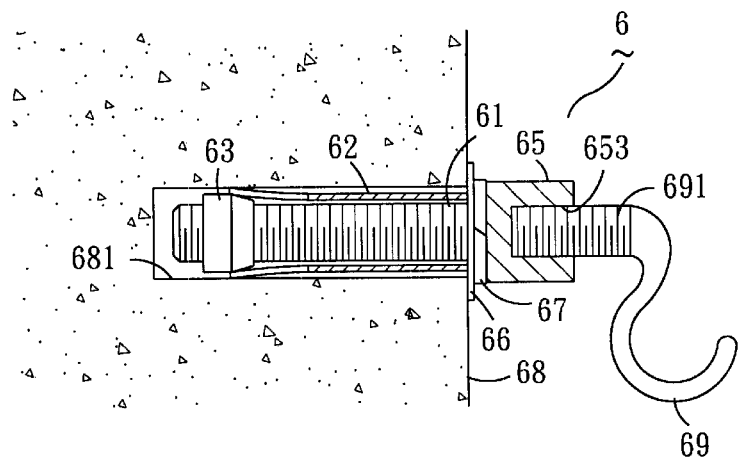
FIG. 9 is a partly sectional side view illustrating the fifth preferred embodiment in a state of use.

FIGS. 8 and 9 illustrate the fifth preferred embodiment of the present invention. As shown, an expansion bolt assembly 6 includes an elongated bolt body, a tubular expansion sleeve 62, and a nut 63. The bolt body is formed with an externally threaded shank portion 61 and a head portion 65 of an enlarged diameter. The shank portion 61 is adapted to be inserted into a bore 681 formed in a wall 68. The head portion 65 extends from the shank portion 61 and is adapted to extend out of the bore 681 and to project from the wall 68. The head portion 65 is formed with an internally threaded hole 653. A washer 66 is sleeved on the shank portion 61 and is adapted to be clamped between the head portion 65 and the wall 68. In addition, a resilient ring 67 may be disposed between the washer 66 and the head portion 65.

The sleeve 62 is sleeved on the shank portion 61 and has a proximate section adjacent to the head portion 65, and a distal section opposite to the proximate section and formed with a plurality of axially extending slits 621. The sleeve 62 cooperates with the shank portion 61 to confine an annular expansion chamber therebetween.

The nut 63 engages threadedly the shank portion 61 adjacent to the distal section of the sleeve 61. The nut 63 is formed with a taper section 631 that extends into the expansion chamber when the bolt body is driven to rotate relative to the nut 63, thereby forcing the distal section of the sleeve 62 to expand so as to be adapted to frictionally engage a bore-defining surface of the wall 68.

During installation, a tool (not shown), such as a spanner, can be used to turn the head portion 65 so as to drive the bolt body to rotate axially into the bore 681. Furthermore, in use, an externally threaded hook member 69 can be disposed to threadedly engage the hole 653 for hanging of an article (not shown) thereon.

Figure 10:
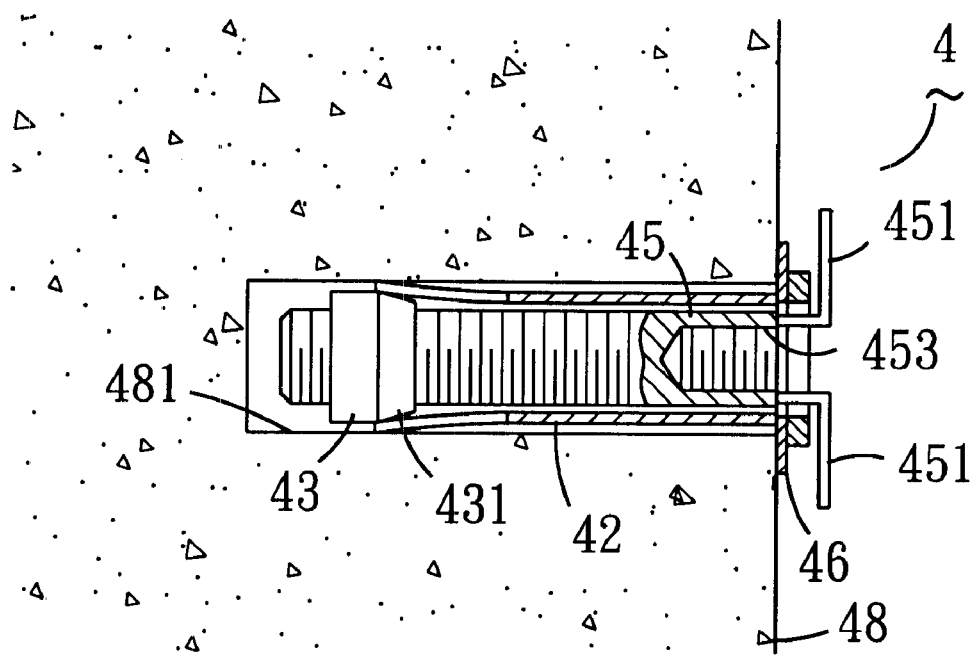
FIG. 10 is a partly sectional side view illustrating the sixth preferred embodiment of an expansion bolt assembly of the invention in a state of use.

FIG. 10 shows the sixth preferred embodiment of the present invention, which is basically similar to the fifth preferred embodiment in structure. As illustrated, an expansion bolt assembly 4 includes an externally threaded shank 45, a washer 46, a tubular expansion sleeve 42, and a nut 43. The shank 45 is adapted to be inserted into a bore 481 formed in a wall 48, and has one end formed with an internally threaded hole 453, and a pair of guide plates 451 adapted to extend out of the bore 481 and to hang an article (not shown) thereon. In addition, during installation, the user can rotate the guide plates 451 so as to drive the bolt body into the bore 481.

The washer 46 is sleeved on the shank 45 and is adapted to be clamped between the guide plates 451 and the wall 48.

The sleeve 42 is sleeved on the shank 45 and has a proximate section abutting against the washer 46, and a distal section opposite to the proximate section and formed with a plurality of axially extending slits.

The sleeve 42 cooperates with the shank 45 to confine an annular expansion chamber therebetween.

The nut 43 engages threadedly the shank 45 adjacent to the distal section of the sleeve 42. The nut 43 is formed with a taper section 431 that extends into the expansion chamber when the shank 45 is driven to rotate relative to the nut 43, thereby forcing the distal section of the sleeve 42 to expand so as to be adapted to frictionally engage a bore-defining surface of the wall 48.

By virtue of the above-described constructions, the expansion bolt assembly of the present invention provides additional functions other than securing an object on a wall.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An expansion bolt assembly adapted to be installed on a wall that is formed with a bore, comprising:

an elongated bolt body formed with an externally threaded shank portion that is adapted to be inserted into the bore, and a head portion that extends from said shank portion and that is adapted to extend out of the bore and to project from the wall, said head portion being formed with an internally threaded hole;

a tubular expansion sleeve sleeved on said shank portion and having a proximate section adjacent to said head portion, and a distal section opposite to said proximate section and formed with a plurality of axially extending slits, said sleeve cooperating with said shank portion to confine an annular expansion chamber therebetween;

a nut engaging threadedly said shank portion adjacent to said distal section of said sleeve, said nut being formed with a taper section that extends into said expansion chamber when said bolt body is driven to rotate relative to said nut, thereby forcing said distal section of said sleeve to expand so as to be adapted to frictionally engage a bore-defining surface of the wall;

a washer sleeved on said shank portion and further adapted to be clamped between said head portion and said wall; and a hook member threadedly engaging said hole.

2. An expansion bolt assembly adapted to be installed on a wall that is formed with a bore, comprising:

an externally threaded shank that is adapted to be inserted into the bore, and that has one end formed with an internally threaded hole, said one end of said shank being formed with a pair of guide plates adapted to extend out of the bore and to hang an article thereon;

a washer sleeved on said shank and adapted to be clamped between said guide plates and the wall;

a tubular expansion sleeve sleeved on said shank and having a proximate section abutting against said washer, and a distal section opposite to said proximate section and formed with a plurality of axially extending slits, said sleeve cooperating with said shank to confine an annular expansion chamber therebetween; and a nut engaging threadedly said shank adjacent to said distal section of said sleeve, said nut being formed with a taper section that extends into said expansion chamber when said shank is driven to rotate relative to said nut, thereby forcing said distal section of said sleeve to expand so as to be adapted to frictionally engage a bore-defining surface of the wall.

* * * * *